350-336

XR  4,021,798

United States Patent [19]
Kojima et al.

[11] 4,021,798
[45] May 3, 1977

[54] LIQUID CRYSTAL DISPLAY PANEL AND METHOD FOR DRIVING THE SAME

[75] Inventors: Hiroomi Kojima, Kamakura; Hideo Zama, Hachioji; Sadao Nomura, Higashi-yamato; Toyoji Tabuchi, Hachioji; Ryozo Murata, Tokyo, all of Japan

[73] Assignee: Hitachi, Ltd., Japan

[22] Filed: Oct. 14, 1975

[21] Appl. No.: 621,842

[30] Foreign Application Priority Data

Oct. 14, 1974  Japan .............................. 49-117164
Oct. 14, 1974  Japan .............................. 49-117163

[52] U.S. Cl. .................... 340/324 M; 340/166 EL; 350/160 LC
[51] Int. Cl.² ............................................. G02F 1/13
[58] Field of Search ...... 340/324 R, 324 M, 166 R, 340/166 EL; 315/169 R, 169 TV; 350/160 LC

[56] References Cited
UNITED STATES PATENTS 3,086,143  4/1963  Wolfe .......................... 315/169 TV
3,725,899  4/1973  Greubel ........................ 340/324 M
3,932,026  1/1976  Sprokel ........................ 350/160 LC Primary Examiner—David L. Trafton
Attorney, Agent, or Firm—Craig & Antonelli

[57] ABSTRACT

A liquid crystal display panel is composed of a plate of ferroelectric material, a group of electrodes arranged in a first direction on one surface of the plate, a second group of electrodes arranged in a second direction orthogonal to the first direction on a second surface of the plate, dielectric films disposed on the first group of electrodes, intermediate electrodes the main part of which is situated on each of the dielectric films and the side part of which is situated on a second surface of the plate opposite each of the second group of electrodes. A transparent substrate is arranged opposite the second surface of the plate, a third group of electrodes are arranged on the transparent substrate opposite and parallel to each of the second group of electrodes and means is provided for connecting each of the second group of electrodes to each of the third group of electrodes which is opposite to the former, and a liquid crystal is interposed between the transparent substrate and the plate.

8 Claims, 20 Drawing Figures

LIQUID CRYSTAL DISPLAY PANEL AND METHOD FOR DRIVING THE SAME

BACKGROUND OF THE INVENTION

1. Field of the Invention

The present invention relates to a liquid crystal display panel composed of picture elements arranged in matrix form having a liquid crystal element and a ferroelectric element and to a method for driving it.

2. Description of the Prior Art

Several liquid crystal display panels are known, in which only liquid crystal picture elements are arranged in matrix form. However, by using such liquid crystal display panels, it is difficult to display moving pictures for the reason (1) that the response speed is low, (2) that no response is obtained by a single pulse and (3) that no satisfactory response is obtained by using a driving equipment having a small duty ratio. In order to overcome these drawbacks, there has been proposed a variety of display devices comprising liquid crystal and non-linear elements in combination.

For example, in U.S. Pat. No. 3,725,899, a liquid crystal display panel is disclosed, in which picture elements having two or three terminals using a ferroelectric material such as a non-linear element are arranged in matrix form. With a liquid crystal display penel composed of two terminal picture elements it is not possible to improve the response speed considerably, while a liquid crystal display panel composed of three terminal picture elements has the drawback in that its structure is so complicated that, in a large scale device, it is not possible to completely prevent cross talk.

In order to overcome the drawbacks mentioned above, two of the inventors of the present invention have proposed, in Japanese patent application No. Sho 47-36914 (Publication No. Sho 49-3649), a liquid crystal display panel, in which two terminal picture elements, arranged in a matrix form of large scale without crosstalk and at the same time having a high response speed, comprising a liquid crystal element and a ferroelectric element connected in series and a capacitor of large capacitance connected in parallel with the liquid crystal element (hereafter this method for improving the characteristics of liquid crystal picture elements is called the "capacitor addition method") are arranged in a matrix form. A liquid crystal picture element according to the capacitor addition method functions in four steps: writing, first discharge, erasing, and second discharge. For writing a potential of positive polarity, which is greater than the coersive force of the ferroelectric element, is applied to the two terminals of the picture element. Since the capacitance of the ferroelectric element is negligibly small with respect to that of the added capacitor, the potential is applied amost entirely to the ferroelectric element and switches its polarization. The added capacitor is charged due to the polarization. During the step of the first discharge, the capacitor is discharged through the liquid crystal element and the latter scatters light. For the erasing step, a potential of negative polarity is applied to the two terminals, in order to return the polarization to its initial state and the capacitor is charged again. After the erasing step, the capacitor is discharged again and the liquid crystal element scatters light. The above mentioned patent application has proposed only a high response speed picture element having two terminals and has not resolved how the number of such picture elements comprising capacitors of large capacitance can be arranged in a matrix form of large scale.

SUMMARY OF THE INVENTION

An object of this invention is to provide a liquid crystal display panel in which picture elements consisting of a liquid crystal element and a ferroelectric element connected in series, and a capacitor connected in parallel to the liquid crystal element, are arranged in matrix form.

Another object of this invention is to provide a method for driving the liquid crystal display panel.

In order to achieve the first object of this invention, the liquid crystal display panel according to this invention consists of a plate of a ferroelectric material, a first group of electrodes arranged on a first surface of the plate, a second group of electrodes arranged on a second surface of the plate perpendicularly to the first group of electrodes, dielectric films disposed on the first group of electrodes, intermediate electrodes, the main part of which is situated on each of the dielectric films and the side part of which is situated in the second surface of the plate opposite each of the first group of electrodes through the plate, a transparent substrate arranged opposite the second surface surface of the plate, a third group of electrodes arranged on the transparent substrate opposite and parallel to each of the second group of electrodes, means for connecting each of the second group of electrodes to each of the third group of electrodes which is opposite to the former, and a liquid crystal interposed between the transparent substrate and the plate.

In order to achieve the second object of this invention, the method for driving the liquid crystal display panel according to this invention consists of a first step of applying a predetermined first potential for a predetermined period of time to the first row of the first group of electrodes, applying a predetermined potential, which is different from the first potential, to the other rows thereof for a predetermined period of time and, at the same time, applying a predetermined second potential to selected columns of the second and third groups of electrodes for a predetermined period of time, so that these potentials impress, across selected picture elements at intersection points of the first row and the respective selected columns, a voltage by which the added capacitor is charged and the ferroelectric element of the selected picture elements switches its polarization corresponding to information to be displayed. The charged added capacitor is discharged through the respective liquid crystal element and the latter scatters light. The second step is the same as the first step for the second and further rows, whereby a predetermined quantity of all the information is diaplayed. The third step is that of applying a predetermined third potential for a predetermined period of time to the first row of the group of electrodes, applying a predetermined potential, which is different from the third potential, to the other rows for a predetermined period of time and, at the same time, applying a predetermined fourth potential to selected columns of the second and third groups of electrodes for a predetermined period of time, so that these potentials impress across the selected picture elements a voltage, by which the ferroelectric element of the picture elements return to an initial state and the added capacitor is charged, whereafter the charged added capacitor is discharged through the respective liquid crystal element and the latter scatters light again. The fourth step is the same as the third step for the second and further rows, whereby a predetermined quality of information is again displayed.

DETAILED DESCRIPTION

Figure 1A:
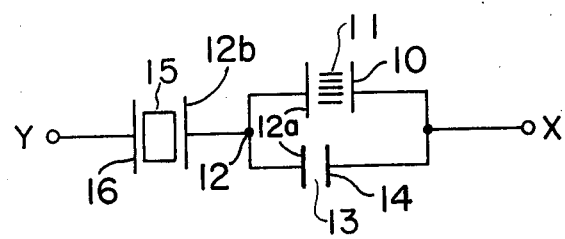
FIG. 1A and 1B are equivalent circuit diagrams of a single liquid crystal picture element usable for a liquid crystal display panel according to the invention.
Figure 1B:
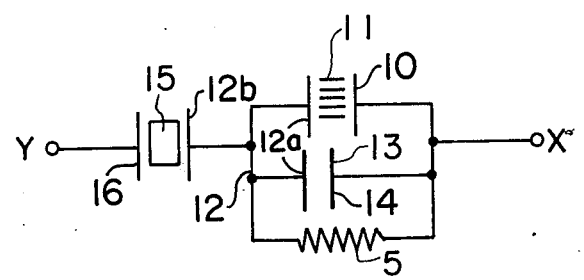
Figure 2:
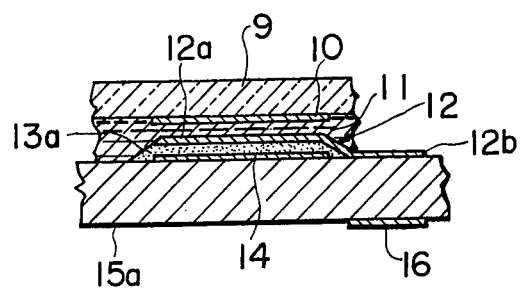
FIG. 2 is a cross-sectional view of a single liquid crystal picture element usable for a liquid crystal display panel according to the invention.

FIGS. 1A and 1B are equivalent circuit diagrams of a single liquid crystal picture element used in a liquid crystal display panel according to the invention and FIG. 2 is a cross-sectional view of the single liquid crystal picture element. Numeral 11 indicates a liquid crystal element, 13 an added capacitor, 15 a ferroelectric element, 5 a distributed resistance in paralle with the capacitor 13, 15a a thin plate of ferroelectric such as PTZ (Pb $(Zr_yTi_{1-y})O_3$) and PLZT $(Pb_{1-x}La_{x-}$ $(Zr_yTi_{1-y})_1 (-x/4) O_3)$, where $0.02 \leq x \leq 0.10$ and $0.05 \leq y \leq 0.95$, 16 a Y-electrode (lower electrode) disposed on a lower surface of the thin plate 15a, and 14 an X-electrode disposed on an upper surface of the thin plate 15a. Numeral 13a represents a thin film formed on the X-electrode 14, which is made of a dielectric material (dielectric material containing powder of a ferroelectric material) or a ferroelectric material (e.g. $BaTiO_3$) having a large dielectric constant, for example, greater than 250. The main part 12a of an intermediate electrode 12 is formed on the dielectric thin film 13a and the side part 12b is formed on the upper surface of the thin plate of a ferroelectric 15a opposite the Y-electrode 16. Numeral 9 is a transparent substrate such as a glass plate disposed opposite the upper surface of the thin plate 15a, 10 a transparent electrode such as a nesa film disposed on the lower surface of the transparent substrate 9 opposite and parallel with the X-electrode 14 and connected to the latter. Numeral 11 is a liquid crystal element interposed between the transparent substrate 9 and the thin plate of a ferroelectric 15a.

In order that the liquid crystal element 11 displays (scatters light) with a high efficiency by the capacitor addition method, the capacitance ratio $C_F:C_L:C_o$ among the ferroelectric element 15, liquid crystal element 11 and capacitor 13 is experimentally the most suitable when it is approximately 1:0.6:60. These capacitances are proportional to the liquid crystal display area. Since the capacitance $C_L$ is negligibly small with respect to the capacitance $C_o$, it is important to choose a suitable value for $C_F:C_o$. It was found that this value should be smaller than 1/50 and greater than 1/500. In case it is greater than 1/50, i.e. the added capacitance is too small, a part of the voltage applied to the added capacitor, which is superposed on a voltage due to a polarization switching current, is too large, and creates noise during light scattering. In case it is smaller than 1/500, i.e. the added capacitor is too large, since the voltage of the added capacitor charged by the polarization switching current is insufficient, it is not possible to obtain satisfactory light scattering. Assuming by way of example that the liquid crystal display area of the single picture element is 400 μm × 300 μm (for a 7-inch TV panel with the number of picture elements being 256 × 256 matrix), the capacitances of the ferroelectric element 15, liquid crystal element 11 and capacitor 13 become 4 PF, 0.4 PF and 240 PF, respectively. In order to realize a capacitor of 240 PF having a capacitor area 400 μm, × 300 μm, a thin film 4 μm thick must be formed of a substance having a dielectric constant of 1,000. This can be realized by a sputtered (or vacuum evaporated) film of a ferroelectric material such as $BaTiO_3$. Regarding the capacitor, dielectric breakdown is feared when it is thinner than 1 μm in case of a substance having a dielectric constant of 250. A dielectric constant exceeding 250 is desired for the dielectric film 13a.

Description will now be made of a case where the construction is in the form of an XY-matrix.

Figure 3A:
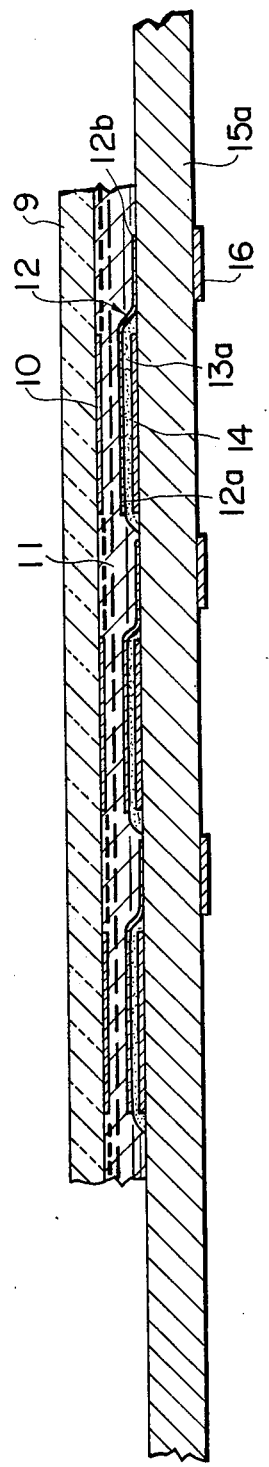
FIG. 3A is a cross-sectional view of a liquid crystal display panel according to the invention.
Figure 3B:
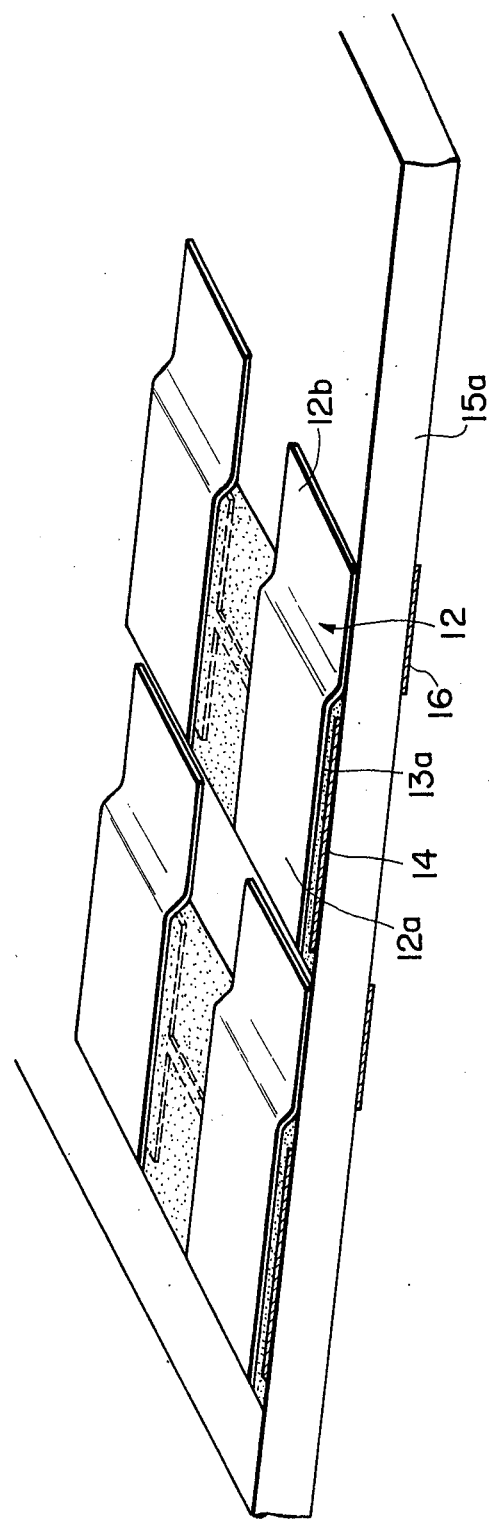
FIG. 3B is a perspective view of a part of the liquid crystal display panel shown in FIG. 3A.

The liquid crystal panel structure for an XY-matrix is shown in FIGS. 3A and 3B. FIG. 3A is a sectional view of the panel in the case where the liquid crystal is layered, while FIG. 3B represents, in perspective, a portion with the liquid crystal in FIG. 3A removed. In the figures, the reference numerals 9–16 correspond to the same elements as in FIG. 2.

Figure 4A:
FIGS. 4A and 4B are a cross-sectional view and a plane view of the transparent substrate and the third group of electrodes, respectively.
Figure 4B:
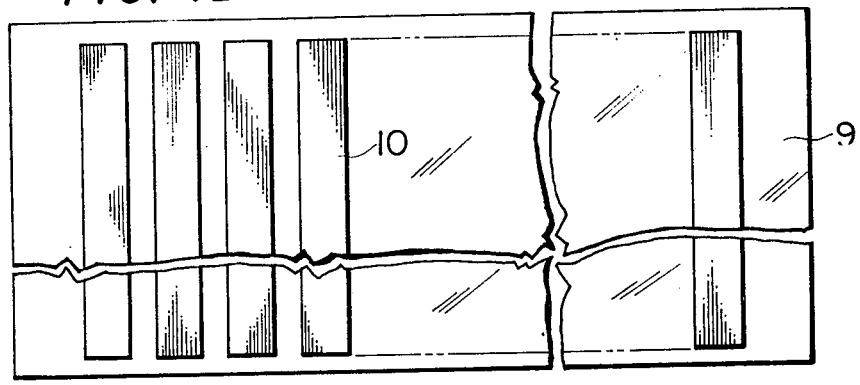
Figure 5:
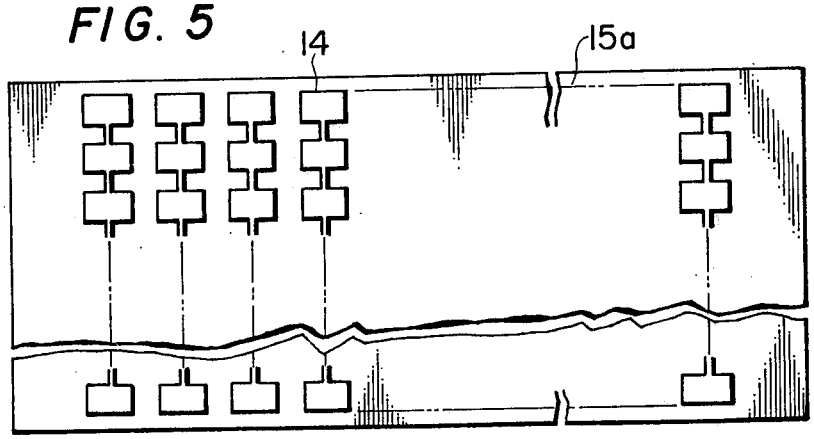
FIG. 5 is a plane view of the second group of electrodes.
Figure 6:
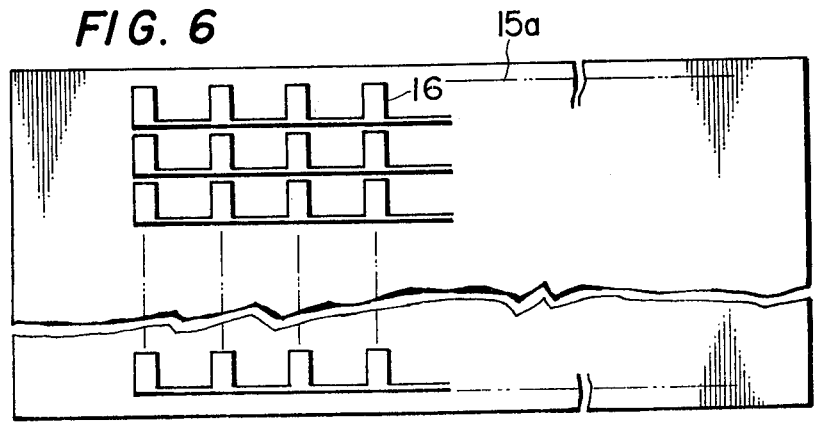
FIG. 6 is a plane view of the first group of electrodes.

The transparent electrodes 10 are in the shape of stripes normal to FIG. 3A. A plan view of the electrodes 10 is shown in FIG. 4B. The X-electrodes 14 are in the shape of stripes normal to the paper in FIG. 3A. A plan view of the electrodes 14 is shown in FIG. 5. The width of the connecting part of such electrodes of the picture elements is as small as about 1/10 relative to the size of the picture element. The transparent electrodes 10 and the X-electrodes 14 are electrically connected at the exterior. Next, the lower electrodes (Y-electrodes) 16 are in the shape of stripes in a direction orthogonal to the X-electrodes 10 (transparent electrodes). A plan view of the electrodes 16 is shown in FIG. 6. In this manner, the width of the connecting part of the electrodes of the picture elements is as small as about 1/10 relative to the size of the picture element.

The reason why the widths of the X and Y electrodes between the picture elements is made small is that the influence of stray capacitance due to the connecting parts of the X and y electrodes is negligible with respect to the essential elements.

As set forth above, this invention has the following advantages:

1. Even in the case of the panel in a matrix form, stray capacitance is negligible, and a highly efficient operation can be effected.

2. When a ferroelectric thin film, such as $BaTiO_3$, having a large dielectric constant, is used as the capacitor material, a capacitor of large capacitance can be formed in a small area. Even where the liquid crystal display area is changed, the capacitor material and the thickness of the thin film need not be changed, and the panel fabricating process is simplified.

3. Since the intermediate electrode is not formed into the shape of a letter T as used in the liquid crystal display panel disclosed in U.S. Pat. No. 3,725,899, the panel fabricating process is shortened.

The above mentioned liquid crystal display panel according to the invention can be driven advantageously as follows.

Description will be first made of the operation of a picture display element in FIG. 1A. Here, it is assumed that the ferroelectric element 15 is under the state of saturation residual polarization $-P_R$ for the P – E hysteresis loop shown in FIG. 8 (the sense of polarization is positive when the polarization is directed from terminal X towards terminal Y and the same applies hereinbelow). E denotes the strength of electric field, and P is the amount of polarization per unit area.

Figure 7A:
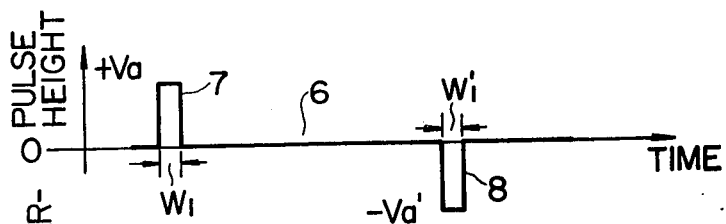
FIG. 7A is a diagram showing a form of voltage pulses applied to a single liquid crystal picture element usable for a liquid crystal display panel according to the invention.
Figure 7B:
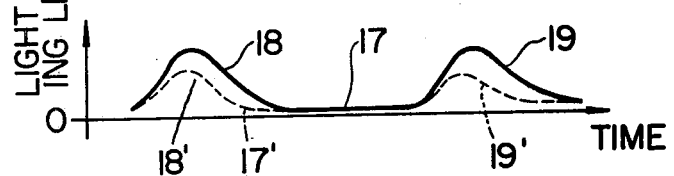
FIG. 7B is a diagram showing variations of light output, when the voltage pulses shown in FIG. 7A are applied to a single liquid crystal picture element usable for a liquid crystal display panel according to the invention.

At this time, when a voltage 6 in FIG. 7A is applied across the terminals X and Y in FIG. 1A (the voltage 6 indicates the voltage of the terminal Y with reference to the terminal X), the light scattering of the liquid crystal display element 11 becomes as shown at 17 (solid line) in FIG. 7B.

Figure 8:
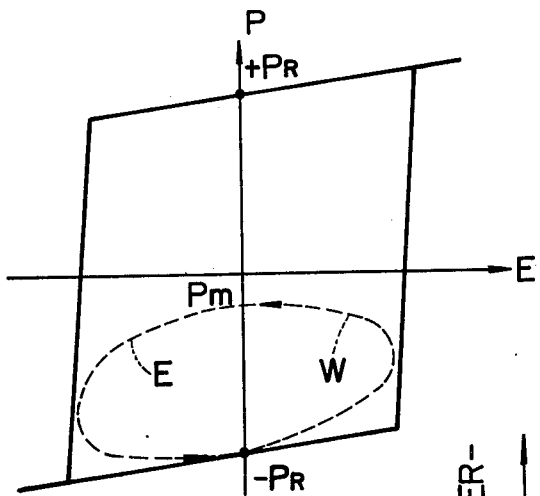
FIG. 8 is an explanatory diagram of the hysteresis curve of the ferroelectric element employed.

Upon the application of a signal voltage 7, the ferroelectric element 15 shifts from the state $-P_R$ via W to a state $P_m$ on the P – E loop of FIG. 8.

At this time, charges based on a polarization of $Q_m = \{P_m - (-P_R)\} \times S_F$ ($S_F$: area of the ferroelectric element accumulation of capacitor 13). The charges $Q_m$ are discharged through the liquid crystal element 11, and then a light scattering level 18 (solid line) is produced.

Next, upon the application of an erasing voltage 8, the ferroelectric element 15 under the state $P_m$ shifts from the state $P_m$ via E back to the initial state $-P_R$ on the P – E loop of FIG. 8. At this time, charges based on a polarization of $Q_m' = \{P_m - (-P_R)\} \times S_F$ accumulate on the capacitor 13 conversely to the previous case. The charges $Q_m'$ are discharged through the liquid crystal element 11, and then a light scattering level 19 (solid line) is provided.

Here, since $Q_m = Q_m'$, the liquid crystal element 11 is A.C. driven. The improvement in the threshold value of the liquid crystal element 11 is made by the use of the threshold value of the ferroelectric element 15, while the action of the liquid crystal display element 11 is improved by the addition of the capacitor 13.

Since $Q_m = Q_m'$, the light scattering effects at 18 and 19 are the same.

Figure 9:
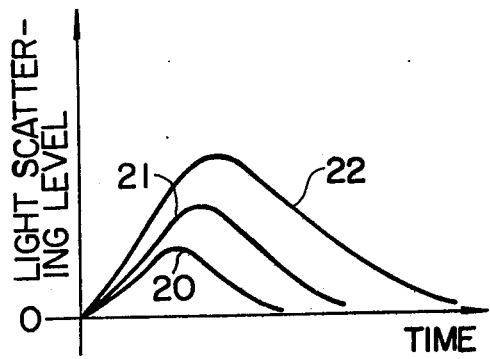
FIG. 9 is a diagram showing variations of light scattering level for different input pulses.

In order to modulate the light scattering level, the amplitude $V_a$ of the signal voltage is modulated, or the pulse width $W_1$ is modulated. Thus, the change $P_m$ of the polarization state from $-P_R$ (variation $\Delta P = P_m - (P_R)$) in the ferroelectric element 15 can be controlled, and light scattering as shown in FIG. 9 is obtained. (The light scattering 20, 21 and 22 correspond to the polarization variations $\Delta P_{20}$, $\Delta P_{21}$ and $\Delta P_{22}$, respectively, which have a relation of $\Delta P_{20} < \Delta P_{21} < \Delta P_{22}$.)

The amplitude $-V_a'$ and the pulse width $W1'$ of the erasing voltage 8 are, of course, so selected that the ferroelectric element 15 can return to the initial state $-P_R$ from either polarization state $P_m$.

In reality, since some electric current flows always through the thin dielectric film 13a, an actual equivalent circuit diagram of a liquid crystal display panel shown in FIG. 2 can be represented as shown in FIG. 1B and a light scattering obtained by applying the voltage 6 becomes a little lower than the solid line 18 and 19 as shown by a broken line 18' 19'. As the distributed resistance 5 decreases, light scattering becomes smaller, but since the added capacitor is discharged faster, liquid crystal display panels having a low distributed resistance are suitable, when a fast scanning is required.

A similar effect can be obtained when the initial state of the ferroelectric element 15 in FIG. 1A or 1B is the state $+P_R$ of the P –E loop in FIG. 8 and the voltage 6 in FIG. 7A (the voltage 6 at this time shall be the voltage of the terminal X with reference to the terminal Y) is applied across the terminals X and Y.

Figure 10:
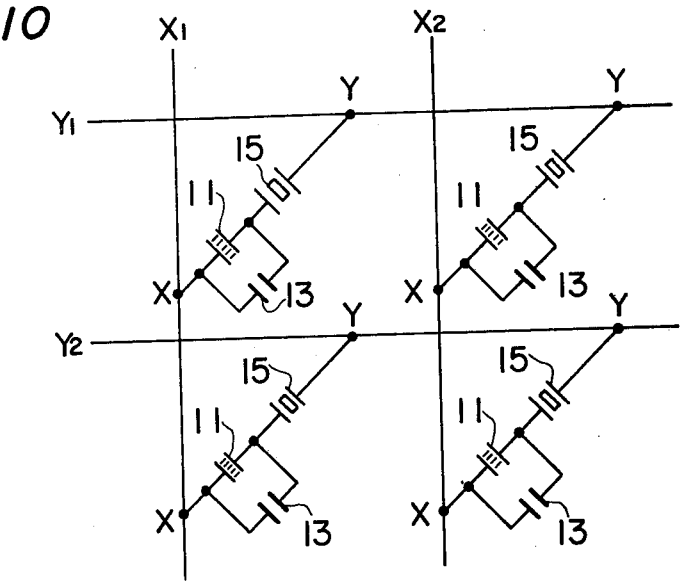
FIG. 10 is a circuit diagram of the liquid crystal display panel driven by the method of this invention.

A matrix display device of a mosaic array employing the picture element of FIG. 1A as the constituent unit is shown in FIG. 10.

Figure 11A:
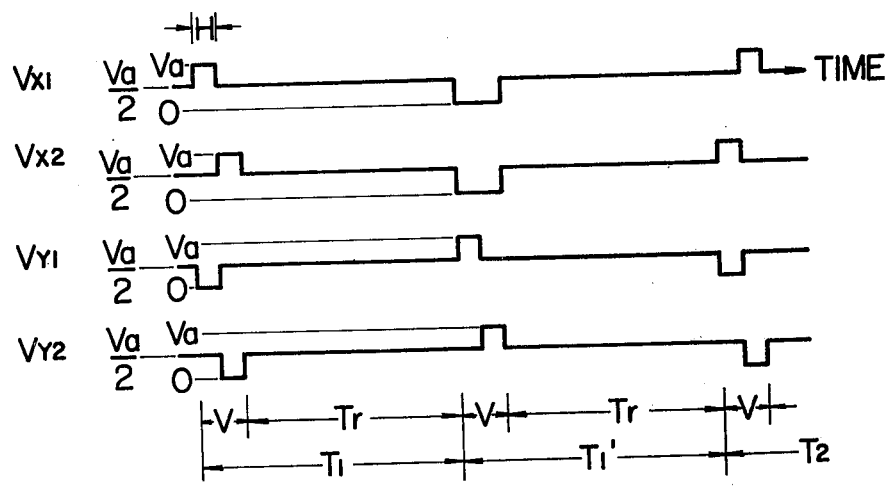
FIG. 11A is a diagram showing voltage pulses driving a liquid crystal display panel having two columns and two rows.
Figure 11B:
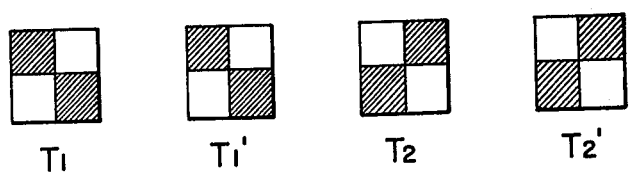
FIG. 11B is a display pattern obtained by employing the driving pulses shown in FIG. 11A.

When, in accordance with the operating principle stated above, row electrodes $Y_1$ and $Y_2$ and column electrodes $X_1$ and $X_2$ are driven as in FIG. 11A, pictures in FIG. 11B are obtained. Here, a shaded part represents a state in which the transmittance or reflectance of the liquid crystal is changed.

In FIGS. 11A and 11B, symbols $T_1$, $T_2$... indicate the writing times of picture information, and symbols $T_1'$, $T_2'$... the erasing times of the written picture information. Each set $(T_1, T_1')$, $(T_2, T_2')$ . . . executes the display of an identical picture twice, and different pictures can be displayed by the respective sets. In FIG. 11A, H denotes a horizontal scanning time, and V a vertical scanning time. Tr within $T_1$, $T_1'$ . . . denotes a quiescent time during which neither the signal voltage nor the erasing voltage is applied, and a driving system becomes simple when Tr is selected to be $n \times V$ ($n=0$, 1, 2, 3 . . .). Accordingly, the actual writing and erasing operations are executed in the vertical periods V. Tr is provided to the end of establishing a sufficient time so that the charges stored in the capacitor 13 of the picture display element (the amount of the charges is dependent upon the picture information) may be fully discharged through the liquid crystal 11. Where the discharge ends within the vertical period V, $Tr = 0$ ($n = 0$) is allowed.

through the liquid crystal 11. Where the discharge ends within the vertical period V, $Tr = 0$ ($n = 0$) is allowed.

This is necessary in case of the usual TV picture display. In, for example, the NTSC system, the vertical scanning time takes 1/60 second every field (about 250 scanning lines). At this time, one horizontal scanning time is about 63μs. In order to effect a display every scanning line, according, V may be made 1/60 second, and H in FIG. 11A is selected as 63μs so as to effect a sequential display with the scanning lines shifted every 63μs in time.

Hereunder, description will be made of a case where there are two scanning lines and where there are two picture elements in the scanning line.

Figure 12:
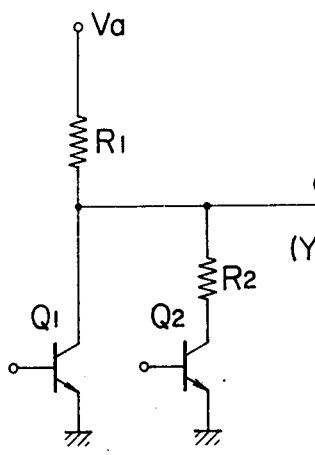
FIG. 12 represents an example of an electric circuit for driving the liquid crystal display panel according to the invention.

An example of a driver circuit for producing drive voltages shown in FIG. 11A is illustrated in FIG. 12. Transistors $Q_1$ and $Q_2$ function as on-off switches, and along with resistances $R_1$ and $R_2$ ($R_1 = R_2 = R$) they generate voltages according to the following table at an output terminal OUT.

TABLE

|  |  | $Q_2$ | |
| --- | --- | --- | --- |
|  |  | ON | OFF |
| $Q_1$ | ON | 0 | 0 |
|  | OFF | $\frac{V_a}{2}$ | $V_a$ |

By connecting the matrix electrodes (the row electrodes $Y_1$ and $Y_2$ and the column electrodes $X_1$ and $X_2$) to the output terminal OUT, a desired operation can be effected.

Of course, the resistance R is made sufficiently smaller than the impedance of the load.

Figure 13A:
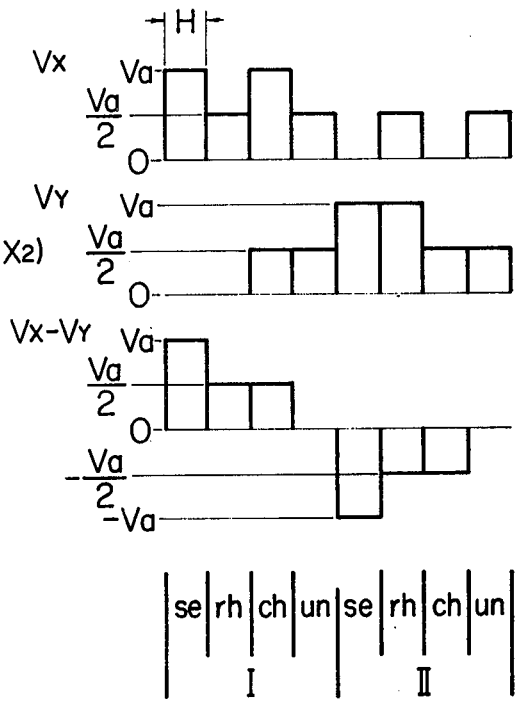
FIG. 13A is a state diagram for a black and white display in case the initial state of the ferroelectric element is $-P_R$.

State diagrams for the operations as shown in FIG. 11A are given in FIG. 13A. I indicates a state diagram for the vertical scanning times V within the times $T_1$, $T_2$... (writing times), while II denotes a state diagram for the vertical scanning times V within the times $T_1'$, $T_2'$... (erasing times).

$V_X$ and $V_Y$ designate the driving voltages of the row electrodes $X_1, X_2$... and the column electrodes $Y_1, Y_2$..., respectively. $V_X - V_Y$ represents potential differences between the row and column electrodes. Of course, $V_X$ and $V_Y$ indicated in the state diagrams may be any $V_X$ and $V_Y$ insofar as they give the voltage $V_X - V_Y$. In the example, the driving voltages are realized with one positive power source $V_a$.

The abbrevation "se" indicates a case where both the row and column electrodes are selected, "rh" a case where the row electrode is selected and where the column electrode is not selected, "ch" a case where the row electrode is not selected and where the column electrode is selected, and "un" a case where neither the row electrode nor the column electrode is selected.

With the driving method illustrated by the state diagram of FIG. 13A, no gradation can be obtained. In contrast, the gradation display is possible by a driving method elucidated in state diagrams of FIGS. 13B and 13C.

Figure 13B:
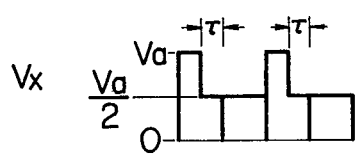
FIGS. 13B and 13C represent examples of a state diagram for gradation display in case the initial state of the ferroelectric element is $-P_R$.
Figure 13B:
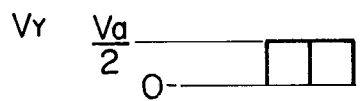
Figure 13B:
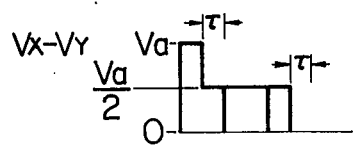
Figure 13B:
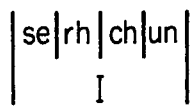
Figure 13C:
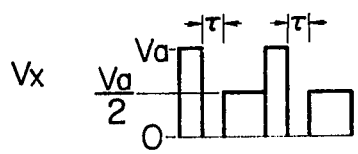
Figure 13C:
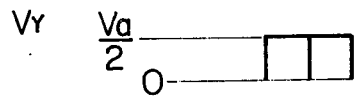
Figure 13C:
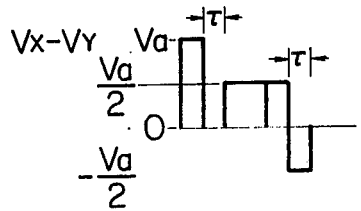
Figure 13C:
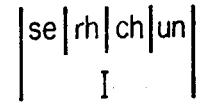

In both FIGS. 13B and 13C, the selective voltage of the driving voltages of the row electrode has a time width τ cut away from the horizontal time H (0 ≦ τ ≦ H). In FIG. 13B the selective voltage is cut away above $V_a/2$ by the time width τ, while in FIG. 13C it is cut away above zero by the same.

When τ increases, the difference of polarization of the ferroelectric element 15, $\Delta P = P_m - (P_R) \times S_F$ decreases.

Such pulse width modulation may be effected for only the signal voltages, and hence, it is employed in the period I of the state diagram.

In the period II succeeding the state diagram in FIG. 13B and 13C, the period II of a state diagram in FIG. 13A may be used.

Although, in the state diagrams of the pulse width modulation in FIGS. 13B and 13C, the pulse width τ is cut from the trailing edge of the selective voltage of the column electrode, it may be also cut from the leading edge. Although the voltage is cut above $V_a/2$ in FIG. 13B and above zero in FIG. 13C, it may also be cut above any value other than these voltage values. The illustrative method of cutting the voltage above $V_a/2$ or above zero can be simply performed in point of the circuit construction. It is possible with the circuit of FIG. 12.

The switching speed of polarization of the ferroelectric element 15 is largely dependent upon the magnitude of the applied voltage. Needless to say, the voltage $V_a$ is set at such a value that the variation of the polarization is negligible even when $V_a/2$ is applied to the ferroelectric element for a long time and that the desired variation of the polarization is acquired within the desired period by the application of $V_a$. Accordingly, this value is determined by taking the properties of the ferroelectrics and the liquid crystal into consideration.

Figure 14A:
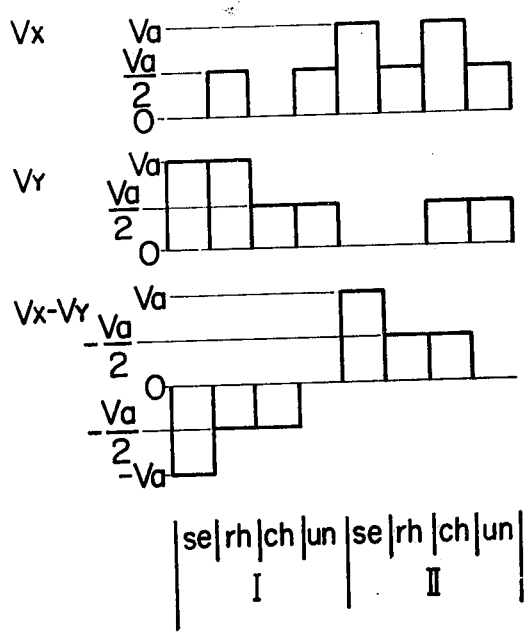
FIG. 14A is a state diagram for a black and white display in case the initial state of the ferroelectric element is $+P_R$.
Figure 14B:
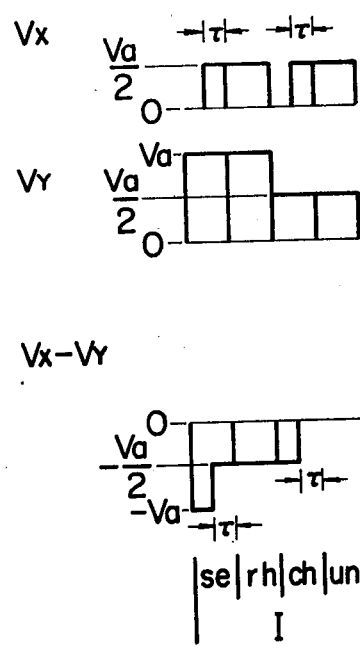
FIG. 14B and 14C represent examples of a state diagram for a gradation display in case the initial state of the ferroelectric element is $+P_R$.
Figure 14C:
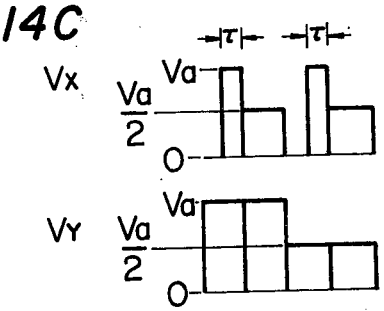
Figure 14C:
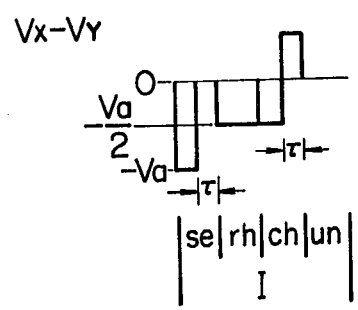

Although, in the above, the initial states of all the ferroelectric element 15 in FIG. 10 have been implied to be the state $-P_R$ in FIG. 8, they may also be the state $P_R$. The drive in the latter case may be carried out with a state diagram of FIG. 14A in which I and II in FIG. 13A are changed for each other. By changing FIGS. 13B and 13C to FIGS. 14B and 14C respectively, the same effect as in the foregoing is achieved. The period II in FIG. 14A is used for a period II in FIG. 14B or 14C.

Although, in the above, the matrix display device in FIG. 10 has been explained as being driven by line sequential scanning, the drive by the dot sequential scanning, is of course possible. Drive voltages at this time will be apparent from the above explanation. Further, the application of the erasing voltage at the erasing times $T_1'$, $T_2'$... is effected for all the picture elements. In this respect, it is permissible to drive all the row electrodes $Y_1, Y_2$... and all the column electrodes $X_1, X_2$... at the same time and to apply the erasing voltage to the individual picture elements in the entire matrix display device, without relying on the dot sequential scanning or on the line sequential scanning.

Although, in the example, a 2 × 2 matrix display device had been explained an M ×N (M, N: integers) matrix display device can also be driven in the same manner as in the above example.

As described above, where the picture elements in FIG. 1A or 1B are arrayed in a mosaic pattern and where the picture display is made by matrix drive, the driving method based on pulse width modulation as illustrated in the state diagram of FIG. 13B, 13C, 14B or 14C is used. First, the display device is driven by the signal voltages subjected to the modulation corresponding to the picture information, whereby one picture is formed. Second, the erasing voltages are merely applied, whereby a picture of the same contents as at the first operation can be formed.

The ferroelectric referred to above is advantageous in that a large-sized panel can be constructed inexpensively. Other elements, for example, semiconductor elements (MOS transistor, etc.) may also be employed.

We claim:
1. A liquid crystal display device comprising:
a plate of ferroelectric material;
a first group of electrodes disposed in a first direction on a first surface of said plate;
a second group of electrodes, disposed in a second direction, orthogonal to said first direction, on a second surface of said plate;
dielectric films disposed on said second group of electrodes;
intermediate electrodes, a principal portion of each of which is disposed on a respective dielectric film and another portion of each of which is disposed on a respective portion of the second surface of said plate adjacent a respective dielectric film and opposite an electrode of said first group of electrodes;
a transparent substrate positioned apart and facing the second surface of said plate;
a third group of electrodes disposed on the surface of said transparent substrate facing the second group of electrodes on the second surface of said plate in said second direction;
means for electrically connecting the respective electrodes of the second group of electrodes to those respective electrodes of the third group of electrodes facing each other; and
a liquid crystal medium interposed between said transparent substrate and said plate.

2. A liquid crystal display device according to claim 1, wherein those portions of each of the electrodes of said first and second groups of electrodes which are not opposite said intermediate electrodes are narrower than the widths of the electrodes facing each other between which said liquid crystal material is disposed.

3. A liquid crystal display device according to claim 2, wherein the widths of said portions of the electrodes of said first and second groups of electrodes are no smaller than one-tenth of the widths of the electrodes facing each other between which said liquid crystal material is disposed.

4. A liquid crystal display device according to claim 1, wherein said first group of electrodes, said ferroelectric plate and said another portion of each of said intermediate electrodes form a group of ferroelectric capacitors, while said principal portion of each of said intermediate electrodes, said dielectric films, and said second group of electrodes form a group of dielectric capacitors, the ratio of the capacitances of said dielectric capacitors to the capacitances of said ferroelectric capacitances being in a range from 50 to 500.

5. A liquid crystal display device according to claim 4, wherein said third group of electrodes, said liquid crystal medium, and said principal portion of each of said intermediate electrodes form a group of liquid crystal picture elements having prescribed capacitances, the ratio of the capacitances of said ferroelectric capacitors, said liquid crystal picture elements and said dielectric capacitors being 1:0.6:60.

6. A method of driving a liquid crystal display device, said device comprising:
a plate of ferroelectric material;
a first group of electrodes disposed in a first direction on a first surface of said plate;
a second group of electrodes, disposed in a second direction, orthogonal to said first direction, on a second surface of said plate;
dielectric films disposed on said second group of electrodes;
intermediate electrodes, a principal portion of each of which is disposed on a respective dielectric film and another portion of each of which is disposed on a respective portion of the second surface of said plate adjacent a respective dielectric film and opposite an electrode of said first group of electrodes;
a transparent substrate positioned apart and facing the second surface of said plate;
a third group of electrodes disposed on the surface of said transparent substrate facing the second group of electrodes on the second surface of said plate in said second direction;
means for electrically connecting the respective electrodes of the second group of electrodes to those respective electrodes of the third group of electrodes facing each other; and
a liquid crystal medium interposed between said transparent substrate and said plate; and
wherein the first group of electrodes are made up of rows of electrodes disposed along said first direction while said second and third groups of electrodes are made up of columns of electrodes disposed along said second direction, so as to form a matrix of liquid crystal picture elements;
said method comprising the steps of:
a.
i. applying a first prescribed potential for a prescribed period of time to a first row of said first group of electrodes,
ii. applying a second prescribed potential, different from said first prescribed potential, to the other rows of said first group of electrodes, for a prescribed period of time, and
iii. applying a third prescribed potential to selected columns of said second and third groups of electrodes, for a prescribed period of time,
so that these potentials impress, across selected picture elements at intersection points of said first row and the selected columns, a voltage to charge a dielectric capacitance defined by the dielectric films said second group of electrodes, and the principal portion of said intermediate electrodes opposite thereto, and the ferroelectric elements defined by said first row of said first group of electrodes, said ferroelectric plate and the other portions of said intermediate electrodes switches its polarization in accordance with information to be displayed, after which said dielectric capacitor discharges through a respective liquid crystal picture element made up of the principal portion of intermediate electrodes, said liquid crystal medium and the electrodes of said third group of electrodes, which liquid crystal picture element scatters light;
b.
i. repeating steps (a) - (i) - (ii) and (iii) for the second and further rows of said first group of electrodes;
c.
i. applying a fourth prescribed potential for a prescribed period of time to the first row of said first group of electrodes, ii. applying a fifth prescribed potential, different from said fourth prescribed potential, to the other rows of said first group of electrodes, for a prescribed period of time, and iii. applying a sixth prescribed potential to selected columns of said second and third groups of electrodes, for a prescribed period of time, so that these potentials impress, across selected picture elements at intersection points of said first row and the selected columns, a voltage to reverse the state of polarization of the respective ferroelectric elements, and said dielectric capacitance is charged, after which said dielectric capacitance discharges through a respective liquid crystal element which, in turn, scatters light; and d.
   i. repeating steps (c)-(i)-(ii)-(iii) for the second and further rows of said first group of electrodes.

7. A method according to claim 6, wherein in step (a), the respective picture elements, the column and row electrodes of which are selected, are impressed with a voltage pulse having an amplitude $Va$, and a width $W$ followed by an amplitude $Va/2$ and a width $\tau$ corresponding to picture information to be displayed, the respective picture elements the column electrodes of which are selected and the row electrodes of which are not selected are impressed with a voltage pulse having an amplitude $|Va/a|$ and a width $W$ followed by an amplitude zero, and a width $\tau$, the respective picture elements, the column electrodes of which are not selected and the row electrodes of which are selected, are impressed with a voltage pulse having an amplitude $Va/2$ and a width $(W + \tau)$, and the respective picture elements the column and row electrodes of which are not selected have zero voltage applied thereto.

8. A method according to claim 6, wherein in step (a)

the respective picture elements, the column and row electrodes of which are selected, are impressed with a voltage pulse having an amplitude $Va$ and a width $W$ followed by an amplitude of zero and a width $\tau$, the respective picture elements, the column electrodes of which are selected and the row electrodes of which are not selected, are impressed with a voltage pulse having an amplitude $Va/2$ and a width $W$ followed by an amplitude $-Va/2$ and a width $\tau$, the respective picture elements the column electrodes of which are not selected and the row electrodes of which are selected are impressed with a voltage pulse having an amplitude $Va/2$ and a width $W + \tau$, and the respective picture elements the column and row electrodes of which are not selected are impressed with zero voltage.

* * * * *